United States Patent [19]

van de Griend et al.

[11] Patent Number: 4,836,910
[45] Date of Patent: Jun. 6, 1989

[54] CATALYTIC DEWAXING WITH ZEOLITE THETA-1

[75] Inventors: Jacob A. van de Griend; Arend Hoek; Tom Huizinga, all of Amsterdam, Netherlands

[73] Assignee: Shell Oil Company, Houston, Tex.

[21] Appl. No.: 62,971

[22] Filed: Jun. 18, 1987

[30] Foreign Application Priority Data

Jul. 30, 1986 [GB] United Kingdom ............... 8618574

[51] Int. Cl.$^4$ ............ C10G 45/62; C10G 45/64
[52] U.S. Cl. .................... 208/120; 208/111; 208/123; 208/124; 208/59
[58] Field of Search ............ 208/111, 120, 123, 124, 208/59

[56] References Cited

U.S. PATENT DOCUMENTS

| | | | | |
|---|---|---|---|---|
| 4,533,649 | 9/1983 | Ball et al. | .............. | 502/71 |
| 4,556,477 | 10/1984 | Dwyer | .............. | 208/111 |
| 4,574,043 | 3/1986 | Chester et al. | . | |

FOREIGN PATENT DOCUMENTS

| | | |
|---|---|---|
| 0057049 | 8/1982 | European Pat. Off. . |
| 0065400 | 4/1985 | European Pat. Off. . |
| 0161833 | 11/1985 | European Pat. Off. . |
| 0183419 | 6/1986 | European Pat. Off. . |

*Primary Examiner*—Glenn Caldarola
*Attorney, Agent, or Firm*—Kimbley L. Muller

[57] ABSTRACT

A process is disclosed for the catalytic dewaxing of a hydrocarbon oil by contacting said oil at catalytic dewaxing conditions with a catalyst comprising a crystalline aluminum silicate which has the following composition in terms of the molar ratios of the oxides:

$$(0.9 \pm 0.2) Z_p O_q : Al_2O_3 : xSiO_2 : yH_2O$$

wherein Z is at least one cation, p and q are each at least one and satisfy the electroneutrality of $Z_pO_q$, x is at least 10 and y/x is 0-25, and which crystalline aluminum silicate has a defined characteristic X-ray diffraction pattern as set forth in Table A.

9 Claims, No Drawings

CATALYTIC DEWAXING WITH ZEOLITE THETA-1

The invention relates to a process for the catalytic dewaxing of a hydrocarbon oil by contacting said oil at catalytic dewaxing conditions with a crystalline aluminum silicate-containing catalyst.

It is know to carry out said process with crystalline aluminum silicates (also referred to as zeolites) of the ZSM-5 type. More recently, it has been found that various other zeolites can also be applied as catalysts in dewaxing processes.

However, the yield of dewaxed hydrocarbon oil obtained with zeolites which have known dewaxing activity leaves room for improvement, whereas the associated production of relatively large amounts of normally gaseous compounds (e.g. containing 1-4 carbon atoms per molecule) is highly undesirable.

A major problem encountered in the search for crystalline aluminum silicates with improved dewaxing properties is that said properties depend heavily on subtle changes in framework topology of the silicates in question.

It has now been found that recently developed crystalline aluminum silicates having a specific X-ray diffraction pattern as given hereinafter are particularly suited for use as catalyst (carrier) in a process for the catalytic dewaxing of hydrocarbon oil, notwithstanding the relatively high gas production attained with said silicates in aromatization processes.

The invention therefore relates to a process for the catalytic dewaxing of a hydrocarbon oil by contacting said oil at catalytic dewaxing conditions with a crystalline aluminum silicate-containing catalyst which crystalline aluminum silicate has the following composition in terms of the molar ratios of the oxides: $(0.9\pm0.2)Z_pO_q:Al_2O_3:xSiO_2:yH_2O$ wherein Z is at least one cation, p and q are each at least one and satisfy the electro-neutrality of $Z_pO_q$, X is at least 10 and y/x is 0-25, and which crystalline aluminum silicate has a X-ray diffraction pattern substantially as set out in the following Table A:

TABLE A

| D-space (±0.1) | 100 × $I/I_{max}$ |
|---|---|
| 11.07 | W |
| 10.81 | M |
| 4.37 | 100 |
| 4.10 | M |
| 3.86 | W |
| 3.82 | W |
| 3.68 | S |
| 3.62 | S |
| 3.46 | M |
| 2.52 | M |
| 2.50 | W |
| 2.44 | W | wherein:
S=70-99
M=30-70
W=0-30.

Crystalline aluminum silicates having a composition and X-ray diffraction pattern in accordance with the formula and Table A, respectively, as given hereinabove have been described e.g. in European Patent Specifications Nos. 57049 and U.S. Pat. No. 4,533,649.

It should be noted that the X-ray diffraction pattern of crystalline aluminum silicates may vary in the values of $100\times I/I_{max}$ (representing the relative intensity of a peak, expressed as a percentage of the intensity of the main peak) and of "D-space" (representing the interplanar spacing in Å (=0.1 nm) calculated from the measured theta (Bragg angle) by using the Bragg equation) depending e.g. upon whether the sample being examined is calcined or uncalcined, upon the temperature of calcination, upon the nature of the cation present in the aluminum silicate, the molar ratio of silica to alumina and the particle size of the sample.

In view of the earlier noted dependence of the catalytic dewaxing properties of crystalline aluminum silicates on subtle changes in their framework topology, which changes are usually represented by relatively small variations in the X-ray diffraction pattern and which may be (partly) masked by the aforementioned factors, the type of directing agent applied in the preparation of said crystalline aluminum silicates can form an important, and in some cases essential, additional characterizing feature of the aluminum silicates in question.

Preferably, the crystalline aluminum silicates applied as catalyst (carrier) in the process according to the invention have been prepared from a starting mixture containing as directing agent a nitrogen-containing (in)organic base such as ammonia or an organic amino compound, more preferably a mono amine and in particular a dihydroxyalkyl amine.

Preferred dihydroxyalkyl amines for the present purpose contain two of the same or different alkyl-groups having from 1-20, and most preferably from 2-6 carbon atoms; at least one of the alkyl-groups contains one or more hydroxy-substituents. A particularly preferred dihydroxyalkyl amine is diethanol amine; the use of said directing agent in the starting mixture enables the preparation of a crystalline aluminum silicate which has optimal properties for use as catalyst (carrier) in the catalytic dewaxing process according to the present invention.

The cation Z in the aluminum silicate may be selected from $H^+$, ammonium, alkali metal cations, alkaline earth metal cations, organic nitrogen-containing cations, aluminum cations, gallium cation, iron cation and mixtures thereof.

A starting mixture from which crystalline aluminum silicates with excellent catalytic dewaxing properties can be prepared, preferably contains a mono amine (designated RN), a source of silica, a source of alumina, a source of alkali metal(s) (designated Z) and water in the following molar ratios, expressed in terms of the (hydr)oxides:

$SiO_2:Al_2O_3$=40-500, in particular 40-150,
$SiO_2:ZOH$=1-20, in particular 5-15,
$H_2O:SiO_2$=4-50, in particular 6-30, and
$SiO_2:RN$=1-100, in particular 10-50.

The alkali metal(s) may suitably be present in the starting mixture in the form of the alkali metal salt of a mineral acid and/or in the form of an alkali metal hydroxide. In any case the aqueous starting mixture has an alkaline character which implies that the pH of the starting mixture is greater than 7. In the aforementioned molar ratios MOH represents free alkali metal hydroxide i.e. hydroxide which is present in the starting mixture in excess of the number of moles of alkali metal hydroxide required to convert alumina present to alkali metal aluminate (i.e. $ZAlO_2$). Most preferably Z represents a sodium- or a potassium ion. However, it is also envisaged to use two or more different alkali metal compounds as source of alkali metal.

Suitable alkali metal salts of mineral acids include sulphates, nitrates and phosphates.

In the starting mixture used to prepare a crystalline aluminum silicate which is applied in the process according to the invention various silicon- and aluminum compounds may be present. Suitable silicon compounds include water glass and preferably amorphous silica (more preferably in the form of a silica sol), while suitable aluminum compounds include aluminum sulphate, aluminum isopropoxide and preferably sodium aluminate.

It is not necessary, however, that the above-mentioned compounds are added to the aqueous starting mixture in that form. They may also be formed from other reaction components e.g. from water glass and sulphuric acid. A preferred starting mixture contains as starting compounds sodium aluminate, sodium hydroxide, water, diethanol amine and silical sol. It is preferred that the silicate source is added to the other starting compounds in such a way as to commence gelation at a pH greater than 10.

The crystalline aluminum silicate is suitably prepared by mixing the starting compounds at temperatures from 0°–100° C., preferably from 20°–60° C., until a homogeneous gel has formed, maintaining the resulting starting mixture for 6–240 hours, and preferably for 24–240 hours, at temperatures from 100°–250° C., preferably from 100°–220° C., under autogeneous pressure until crystalline aluminum silicate has formed and separating aluminum silicate thus formed from the mother liquor (e.g. by means of filtration or centrifugation). Preferably, the crystalline aluminum silicate thus obtained is washed (with water or an alkaline- or acid solution) and dried (suitably at temperatures from 100°–200° C.).

The product obtained in this manner contains cations which may be hydrogen, alkali metal(s), aluminum, organic nitrogen containing cations, ammonium or any combination thereof. An alkali metal content of more than 0.1% by weight is undesirable when applying the crystalline aluminum silicates in question as dewaxing catalyst (carrier) in the catalytic dewaxing of hydrocarbons. In order to reduce the alkali metal content of said aluminum silicates to less than 0.1% by weight, and in particular to less than 0.01% by weight, and to substantially remove any other undesired cations, the aluminum silicates are preferably converted into the hydrogen-form by contacting them once or several times with (a) ammonium- or (b) acid-containing solutions or a combination of (a) and (b). From the ammonium-silicates which can be obtained in said manner the hydrogen-silicates can be prepared by calcination which is suitably carried out at temperatures from 200°–600° C., and preferably from 400°–550° C. at atmospheric-, elevated- or sub-atmospheric pressure, optionally in the presence of hydrogen, oxygen or an inert gas such as nitrogen.

If desired, the performance in the catalytic dewaxing process according to the invention of the crystalline aluminum silicates which have been treated in the above-described manner can be even further improved by using them as a carrier for one or more catalytically active metals from Groups 4b, 5b, 6b, 7b and 8 of the Periodic Table of the Elements or compounds thereof. Reference is made in this respect to the Handbook of chemistry and physics, 55th edition (1975), CRC Press, Ohio USA. Of particular interest are the metals titanium, molybdenum, tungsten, chromium, iron, nickel, cobalt, platinum, palladium, ruthenium, rhodium, osmium and iridium; platinum and/or palladium are preferred because their use leads to such a high dewaxed product quality that further hydrotreating of the dewaxed product may be avoided. The metals or their compounds may be deposited on the crystalline aluminum silicate by means of any process for the preparation of catalysts known in the art, such as impregnation, ion-exchange and/or precipitation. Alternatively, the metals or their compounds, especially noble metals, can be deposited on a binder material before combining said material, suitably in a weight ratio from 0.2–10 (silicate to binder), with the crystalline aluminum silicate by means of extruding, pressing or other types of solids mixing known in the art. The binder for this purpose may be any of the conventional refractory oxides (e.g. silica and/or alumina) or molecular sieve materials applied in catalysts; preferably a binder material is used which contains no or only very little alkali metal.

The metal-loaded crystalline aluminum silicate-containing catalysts preferably comprise from 1–50% by weight, in particular 2–20% by weight of a non-noble metal from Group 4b, 5b, 6b, 7b and/or 8, or a noble metal from Groups 8. Noble metals are preferably present in the catalysts in an amount form 0.001–5% by weight, in particular from 0.01–2% by weight.

The crystalline aluminum silicate-containing catalysts employed in the process according to the invention should generally be available in the form of particles with a diameter from 0.2–10 mm, and preferably from 0.5–5 mm. As the aluminum silicates in question are normally obtained in the form of a fine powder, however, they should be shaped to form particles of a larger size, optionally together with a binder material as discussed hereinbefore, for instance by pressing or extruding.

The catalysts may be used in the form of fixed-, fluidized- or moving beds in the process according to the invention; fixed beds (optionally in stacked bed configuration, using the same or different catalyst particles in subsequent beds) being preferred for most applications.

The hydrocarbon oil feed to be dewaxed may be suitably led downwardly in trickle phase operation through said fixed catalyst beds in the presence or absence of additional hydrogen.

The catalytic dewaxing process according to the present invention is preferably carried out at a temperature from 200°–450° C., a pressure from 2–150 bar abs. and a space velocity from 0.1–5 kg feed/l catalyst/hour. The process is most preferably carried out at a temperature from 250°–400° C., a pressure from 10–100 bar abs. and a space velocity from 0.2–3 kg feed/l catalyst/hour. Preferably, the process according to the invention is carried out in the presence of hydrogen, in particular at a hydrogen partial pressure from 5–100 bar and a hydrogen/hydrocarbon oil feed ratio from 100–2500 l (S.T.P.)/kg feed ("S.T.P." means Standard Temperature (0° C.) and Pressure (1 bar abs.) in this context).

The hydrocarbon oils which are to be dewaxed with the crystalline aluminum silicate catalyst (carrier) are preferably selected from the group consisting of lubricating oils, transformer oils (in order to reduce their pour point), and kerosenes and gas oils (in order to reduce their freezing point).

The present invention further relates to hydrocarbon oils whenever catalytically dewaxed according to a process as described hereinbefore.

The invention is illustrated by the following Example.

EXAMPLE (a) characterization of crystalline aluminum silicate dewaxing catalyst A.

The hydrogen-form of the crystalline aluminum silicate A which was applied as catalyst in the dewaxing experiments 1 and 2 had the following composition in terms of the molar ratios of the oxides:

$1Z_2O:1Al_2O_3:70SiO_2:0H_2O$, wherein Z is H$^+$.

Said crystalline aluminum silicate had the characteristic X-ray diffraction pattern in the uncalcined- as well as in the calcine-form as given hereinafter in Table B:

TABLE B

| D-space (±0.1) | 100 × I/I$_{max}$ |
| --- | --- |
| 11.07 | 25 |
| 10.81 | 44 |
| 4.37 | 100 |
| 4.10 | 45 |
| 3.86 | 19 |
| 3.82 | 16 |
| 3.68 | 98 |
| 3.62 | 71 |
| 3.46 | 44 |
| 2.52 | 37 |
| 2.50 | 17 |
| 2.44 | 17 |

(b) characterization of crystalline aluminum silicate dewaxing catalyst B.

The hydrogen-form of the crystalline aluminum silicate B which was applied as catalyst in comparative dewaxing experiment 3 had the following composition in terms of the molar ratios of the oxides:

$1Z_2O:1Al_2O_3:92SiO_2:0H_2O$, wherein Z is H$^+$.

Said crystalline aluminum silicate B had the characteristic X-ray diffraction pattern of a ZMS-5 type of zeolite as given in Table C:

TABLE C

| D-space | 100 × I/I$_{max}$ |
| --- | --- |
| 11.03 | 73 |
| 9.90 | 40 |
| 3.84 | 100 |
| 3.80 | 70 |
| 3.73 | 40 |
| 3.70 | 60 |
| 3.63 | 24 |
| 3.62 | 23 |
| 3.12 | 35 |
| 2.98 | 35 |

(c) Dewaxing experiments.

Catalytic dewaxing experiments were carried out in once through operation in a microflow reactor containing a fixed bed of Catalyst A or B, both diluted in a 1:1 volume ratio with silicon carbide particles.

A waxy raffinate of North Sea origin, useful as a base material for the preparation lubricating oils, containing 30% by weight of wax, 11 ppmw of sulphur and less than 1 ppmw of nitrogen, and having a pour point of +33° C. according to ASTM D97 was catalytically dewaxed in the presence of hydrogen under operating conditions given in the following Table D:

TABLE D

| | Experiment: | | |
| --- | --- | --- | --- |
| | 1 | 2 | 3 |
| partial hydrogen pressure, bar | 40 | 40 | 40 |
| space velocity, kg feed/l catalyst/hour | 1.0 | 1.0 | 1.0 |
| average reactor temperature, °C. | 321 | 290 | 280 |
| hydrogen/oil ratio, l(S.T.P.)/ kg oil feed | 500 | 500 | 500 |
| catalyst | A | A | B |

The liquid raffinates obtained in Experiments 1, and 2 and 3 after catalytic dewaxing were distilled in a vigreux column; the resulting fractions boiling above 300° C. had pour points measured according to ASTM D97 as indicated hereinafter in Table E, together with the yield of dewaxed oil boiling above 370° C. ("yield 370+, % by weight"), the catalyst deactivation rate ("deactivation rate, °C./100 h"), the chemical hydrogen consumption ("H$_2$ consumption, % by weight"), and the product of normally gaseous by-products having 1–4 carbon atoms per molecule ("C$_1$–C$_4$ product, % by weight"):

TABLE E

| | Experiment | | |
| --- | --- | --- | --- |
| | 1 | 2 | 3 |
| pour point, °C. | −20 | −9 | −20 |
| yield 370+, % w | 76 | 85 | 73 |
| deactivation rate, °C./100 h | 1.2 | — | 9.0 |
| H$_2$ consumption, % w | 0.28 | 0.22 | 0.37 |
| C$_1$–C$_4$ product, % w | 7.7 | 3.1 | 12.3 |

From the results given in Table E it will be clear that with the process according to the invention a higher yield of dewaxed hydrocarbon oil can be attained with considerably less C$_1$–C$_4$ gas production and hydrogen consumption than with a process in which a ZMS-5 type of dewaxing catalyst is applied.

Moreover, the stability of the crystalline aluminum silicate catalyst when applied in the present dewaxing process is significantly higher (corresponding to a low deactivation rate in Experiment 1) than that of the ZSM-5 type of catalyst tested in comparative Experiment 3.

We claim:

1. A process for catalytic dewaxing of hydrocarbon oil by contacting said oil at catalytic dewaxing conditions with a crystalline alminum silicate-containing catalyst having the following composition in terms of the molar ratios of the oxides:

$(0.9\pm0.2)Z_pO_q:Al_2O_3:xSiO_2:yH_2O$ wherein Z is at least one cation, p and q are each at least one and satisfy the electroneutrality of $Z_pO_q$, x is at least 10 and y/x is 0–25, and which crystalline aluminum silicate has an alkaline metal content of not more than 0.1% by weight and a X-ray diffraction patent substantially as set out in the following Table A:

TABLE A

| D-space (±0.1 | 100 × I/I$_{max}$ |
| --- | --- |
| 11.07 | W |
| 10.81 | M |
| 4.37 | 100 |
| 4.10 | M |
| 3.86 | W |
| 3.82 | W |
| 3.68 | S |

TABLE A-continued

| D-space (±0.1) | 100 × I/I$_{max}$ |
|---|---|
| 3.62 | S |
| 3.46 | M |
| 2.52 | M |
| 2.50 | W |
| 2.44 | W | wherein:
S = 70–99
M = 30–790
W = 0–30.

2. The process according to claim 1 wherein the crystalline aluminum silicate has been prepared from a starting mixture containing a mono amine as directing agent.

3. The process of claim 2 wherein said mono amine is a dihydroxyalkyl amine.

4. The process according to claim 2 wherein the starting mixture contains a mono amine (RN), a source of silica, a source of alumina, a source of alkali metal(s) (Z) and water in the following molar ratios, expressed in terms of the hydroxides:

$SiO_2:Al_2O_3 = 40-500$,
$SiO_2:ZOH = 1-20$,
$H_2O:Si_2 = 4-50$, and
$SiO_2:RN = 1-100$.

5. The process according to claim 1 wherein said crystlline aluminum silicate is prepared by mixing said molar compositions at tempratures from 0°–100° C. until a homogeneous gel is formed, maintaining the resulting homogeneous gel for 6–240 hours at temperatures of from 100°–250° C. under autogeneous pressure to form said aluminum silicate and then separating said crystalline aluminum silicate from the mother liquor.

6. The process according to claim 1 wherein said catalytic dewaxing conditions include a temperature of from 200°–450° C., a pressure from 2–150 bar abs. and a space velocity from 0.1–5 kg feed/l catalyst/hour.

7. The process according to claim 1 wherein said catalytic dewaxing is performed in the presence of hydrogen at a hydrogen pressure from 5–100 bar and a hydrogen/hydrocarbon oil ratio from 100–2500 l (S.T.P.)/kg feed.

8. The process according to claim 1 wherein the catalyst contains at least one metal selected from the group consisting of metals of Groups 4b, 5b, 6b, 7b, 8 and compounds thereof.

9. The process according to claim 1 wherein said hydrocarbon oil to be dewaxed is selected from the Group consisting of lubricating oils, transformer oils, kerosenes and gas oils.

* * * * *